I. A. PAINE.
Glass-Ball Target.
No. 196,379.   Patented Oct. 23, 1877.
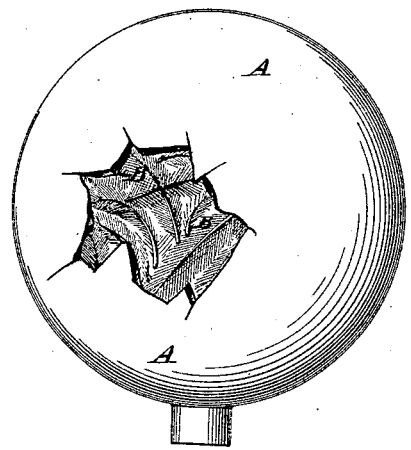

UNITED STATES PATENT OFFICE.

IRA A. PAINE, OF NEW YORK, N. Y.

IMPROVEMENT IN GLASS-BALL TARGETS.

Specification forming part of Letters Patent No. 196,379, dated October 23, 1877; application filed September 22, 1877.

*To all whom it may concern:*

Be it known that I, IRA A. PAINE, of New York city, in the county and State of New York, have invented a new and useful Improvement in Balls for Trap-Shooting, of which the following is a specification:

The figure is a side view of one of my improved balls, part being broken away to show the construction.

The object of this invention is to furnish balls for trap-shooting which shall be so constructed as to "make the feathers fly" when broken by the shot, producing the same effect as when birds are struck by the shot.

The invention consists in a hollow glass ball for trap-shooting, filled with feathers or other light material, as will be hereinafter fully described.

A represents the ball, which is made of glass, is smooth upon the outer side, and has a neck upon one side for placing it upon the trap.

The ball A is filled with feathers B or other light material, as shown in the figure, which, when the ball A is broken by the shot, will be scattered through the air, showing that the ball was broken by the shot, and producing an effect similar to that produced when a bird is struck by shot, and enabling the marksman to see the effect of his shot, the smoke having time to disappear before the feathers can possibly reach the ground.

Having thus described my invention, what I claim as new, and desire to secure by Letters Patent, is—

A hollow glass ball for trap-shooting, filled with feathers or other light material, substantially as herein shown and described.

IRA A. PAINE.

Witnesses:
 JAMES T. GRAHAM,
 C. SEDGWICK.